US012589589B2

(12) United States Patent
Masuhara

(10) Patent No.: US 12,589,589 B2
(45) Date of Patent: Mar. 31, 2026

(54) PRINTING APPARATUS AND PRINTING METHOD

(71) Applicant: SCREEN HOLDINGS CO., LTD., Kyoto (JP)

(72) Inventor: Takaaki Masuhara, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 219 days.

(21) Appl. No.: 18/354,128

(22) Filed: Jul. 18, 2023

(65) Prior Publication Data

US 2024/0034059 A1 Feb. 1, 2024

(30) Foreign Application Priority Data

Jul. 27, 2022 (JP) ................................ 2022-119656

(51) Int. Cl.
*B41J 2/045* (2006.01)

(52) U.S. Cl.
CPC ....... *B41J 2/04588* (2013.01); *B41J 2/04541* (2013.01); *B41J 2/04581* (2013.01)

(58) Field of Classification Search
CPC ........................................................ B41J 29/38
See application file for complete search history.

(56) References Cited

U.S. PATENT DOCUMENTS 5,349,905 A * 9/1994 Taylor ................ B41J 11/00216 101/424.1
6,145,949 A 11/2000 Takahashi
2005/0116974 A1* 6/2005 Suzuki ................... B41J 2/2121 347/10
2009/0015617 A1* 1/2009 Odaka .................... B41J 2/0458 347/16
2012/0050363 A1 3/2012 Nagashima
2014/0267480 A1 9/2014 Yoshida
2015/0258780 A1* 9/2015 Hayashi ............... B41J 2/04581 347/6

FOREIGN PATENT DOCUMENTS

EP 0985532 A2 3/2000
JP 11-020158 A 1/1999
JP 2004-338414 A 12/2004

OTHER PUBLICATIONS

Extended European Search Report issued for the corresponding European patent Application No. 23187243.3 on Nov. 28, 2023.

* cited by examiner

*Primary Examiner* — Shelby L Fidler
(74) *Attorney, Agent, or Firm* — Rimon P.C.

(57) ABSTRACT

A waveform DB for holding a plurality of pieces of waveform data representing respective waveforms of a plurality of drive signals is provided. Each print job is associated with waveform data in a control unit and a waveform number for specifying the waveform data is transmitted from the control unit to a head control unit. The head control unit transfers the waveform number transmitted from the control unit to a head drive board for each print job. The head drive board extracts waveform data corresponding to the waveform number transferred from the head control unit from the waveform DB and gives a drive signal with a waveform corresponding to the extracted waveform data to an inkjet head, for each print job.

19 Claims, 18 Drawing Sheets

Fig.7

71

| WAVEFORM NUMBER | WAVEFORM DATA |
|---|---|
| 0 | WAVEFORM SUITABLE FOR HIGH-SPEED PRINTING FOR C COLOR |
| 1 | WAVEFORM SUITABLE FOR LOW-SPEED PRINTING FOR C COLOR |
| 2 | WAVEFORM SUITABLE FOR HIGH-SPEED PRINTING FOR M COLOR |
| 3 | WAVEFORM SUITABLE FOR LOW-SPEED PRINTING FOR M COLOR |
| 4 | WAVEFORM SUITABLE FOR HIGH-SPEED PRINTING FOR Y COLOR |
| 5 | WAVEFORM SUITABLE FOR LOW-SPEED PRINTING FOR Y COLOR |
| 6 | WAVEFORM SUITABLE FOR HIGH-SPEED PRINTING FOR K COLOR |
| 7 | WAVEFORM SUITABLE FOR LOW-SPEED PRINTING FOR K COLOR |

Fig.8

72

| WAVEFORM NUMBER | WAVEFORM DATA |
|---|---|
| 0 | WAVEFORM WITH WHICH NO SATELLITE DROP OCCURS (WAVEFORM SUITABLE FOR IMAGE WITH MANY CHARACTERS) |
| 1 | WAVEFORM WITH WHICH SATELLITE DROP OCCURS AND GRAININESS IS IMPROVED (WAVEFORM SUITABLE FOR PICTORIAL IMAGE) |
| 2 | WAVEFORM FOR DISCARDED SOLID PRINTING AND FLASHING |
| 3 | WAVEFORM FOR MENISCUS FORMATION (OSCILLATING WAVEFORM) |
| ⋮ | ⋮ |

Fig.9

| INK COLOR | CONVEYANCE SPEED | WAVEFORM NUMBER |
|---|---|---|
| C | HIGH | 0 |
| C | LOW | 1 |
| M | HIGH | 2 |
| M | LOW | 3 |
| Y | HIGH | 4 |
| Y | LOW | 5 |
| K | HIGH | 6 |
| K | LOW | 7 |

Fig.12

| WAVEFORM NUMBER | WAVEFORM DATA |
|---|---|
| 0 | WAVEFORM SUITABLE FOR PRINTING CHARACTER |
| 1 | WAVEFORM SUITABLE FOR PRINTING LINE |
| 2 | WAVEFORM SUITABLE FOR PRINTING PICTURE |
| ⋮ | ⋮ |

74

Fig.13

| IMAGE TYPE | WAVEFORM NUMBER |
|---|---|
| CHARACTER | 0 |
| LINE | 1 |
| PICTURE | 2 |
| ⋮ | ⋮ |

PRINTING APPARATUS AND PRINTING METHOD

BACKGROUND OF THE INVENTION

Field of the Invention

The present invention relates to a printing apparatus including a head that ejects ink depending on a drive signal.

Description of Related Art

There has been known a printing apparatus of inkjet type (hereinafter referred to as an "inkjet printing apparatus") that performs printing by ejecting ink toward a print medium (typically, print paper) by heat or pressure. In a drop-on-demand type inkjet printing apparatus, for example, ink is ejected by mechanical pressure using a piezoelectric element. Regarding such an inkjet printing apparatus, a head (hereinafter referred to as an "inkjet head"), which is a mechanism for ejecting ink onto a print medium, is provided with many nozzles, which are ink ejection ports. In the inkjet printing apparatus using the piezoelectric element, the piezoelectric element is provided corresponding to each nozzle, and the piezoelectric element is deformed based on a drive signal (drive voltage) having a predetermined drive waveform, so that ink in an ink chamber adjacent to the nozzle is pressurized. Thereby, the ink is ejected from the nozzle toward the print medium.

As above, in the inkjet printing apparatus, printing is performed on the print medium by controlling whether or not to eject the ink from each nozzle by the drive signal.

Note that the following related art documents are known in connection with the present invention. Japanese Laid-Open Patent Publication No. 11-20158 discloses a technique of switching a drive waveform for driving a recording head in accordance with an ambient temperature. According to this technique, the recording density is kept constant regardless of the temperature. Japanese Laid-Open Patent Publication No. 2004-338414 discloses a technique of analyzing an operating state of a nozzle based on print data and applying fine vibration to a meniscus in accordance with the operating state of the nozzle. According to this technique, an increase in ink viscosity is prevented, and the flying of ink droplets is stabilized.

Meanwhile, regarding the inkjet printing apparatus, how to improve the print quality has been an issue heretofore. For example, depending on the print rate of the print job to be executed, the drying of the printed print paper by the drying unit (heater, etc.) may not be in time or the supply of ink to the inkjet head may not be in time. When the drying by the drying unit or the supply of ink is not in time as above, printed matter of sufficient quality cannot be obtained. In addition, the print quality may change depending on the type of printed matter, for example, sufficient quality can be obtained for text printed matter but not for pictorial printed matter. As described above, in the conventional inkjet printing apparatus, variations in print quality may occur depending on the attribute of the print job.

Note that the technique disclosed in Japanese Laid-Open Patent Publication No. 11-20158 or the technique disclosed in Japanese Laid-Open Patent Publication No. 2004-338414 cannot suppress the occurrence of variations in print quality due to differences in attributes of print jobs.

SUMMARY OF THE INVENTION

In view of the above circumstances, an object of the present invention is to provide a printing apparatus and a printing method capable of reducing variations in print quality as compared to the related art.

One aspect of the present invention is directed to a printing apparatus that performs printing by ejecting ink onto a print medium, the printing apparatus including:

- an ink ejection unit configured to eject ink onto the print medium based on a given drive signal;
- an ejection control unit configured to give a drive signal to the ink ejection unit;
- a waveform data holding unit configured to hold a plurality of pieces of waveform data representing respective waveforms of a plurality of drive signals; and
- an association unit configured to associate each print job with one or more pieces of waveform data among the plurality of pieces of waveform data,
- wherein for each print job, the ejection control unit extracts waveform data associated by the association unit from the waveform data holding unit and gives, to the ink ejection unit, a drive signal with a waveform corresponding to the waveform data extracted.

With such a configuration, the inkjet printing apparatus is provided with the waveform data holding unit that holds a plurality of pieces of waveform data representing respective waveforms of a plurality of drive signals to be given to the ink ejection unit that ejects ink. Each print job is associated by the association unit with one or more pieces of waveform data among the plurality of pieces of waveform data. Then, for each print job, the waveform data associated by the association unit is extracted from the waveform data holding unit, and the ink is ejected from the ink ejection unit based on the drive signal with the waveform corresponding to the extracted waveform data. From the above, each print job is associated with appropriate waveform data, whereby printing is performed considering the characteristics of each print job. This makes it possible to obtain printed matter of sufficient quality regardless of the content of an image that is printed by the execution of a print job. Thus, a printing apparatus capable of reducing variations in print quality as compared to the related art is achieved.

Another aspect of the present invention is directed to a printing apparatus that performs printing by ejecting ink onto a print medium, the printing apparatus including:

- a plurality of print heads configured to eject ink onto the print medium based on a given drive signal;
- an ejection controller configured to give a drive signal to the plurality of print heads;
- a waveform data database configured to hold a plurality of pieces of waveform data representing respective waveforms of a plurality of drive signals; and
- a processor configured to associate each print job with one or more pieces of waveform data among the plurality of pieces of waveform data,
- wherein for each print job, the ejection controller extracts waveform data associated by the processor from the waveform data database and gives, to the plurality of print heads, a drive signal with a waveform corresponding to the waveform data extracted.

Still another aspect of the present invention is directed to a printing method in a printing apparatus including an ink ejection unit configured to eject ink onto a print medium based on a given drive signal, the printing method including:

- an association step of associating each print job with one or more pieces of waveform data among a plurality of pieces of waveform data; and
- an ejection control step of giving a drive signal to the ink ejection unit, wherein the printing apparatus includes a waveform data holding unit configured to hold a plurality of pieces of waveform data representing respective waveforms of a plurality of drive signals, and in the ejection control step, for each print job, waveform data associated in the associating step is extracted from the waveform data holding unit and a drive signal with a waveform corresponding to the waveform data extracted is given to the ink ejection unit.

These and other objects, features, modes, and advantageous effects of the present invention will become more apparent from the following detailed description of the present invention with reference to the accompanying drawings.

BRIEF DESCRIPTION OF THE DRAWINGS

FIG. 7 is a diagram for explaining data stored in a waveform DB in the first embodiment;

FIG. 8 is a diagram showing another example of data stored in the waveform DB in the first embodiment;

FIG. 9 is a diagram for explaining a reference table in the first embodiment;

FIG. 12 is a diagram for explaining data stored in a waveform DB in a second embodiment of the present invention;

FIG. 13 is a diagram for explaining a reference table in the second embodiment;

DETAILED DESCRIPTION OF PREFERRED EMBODIMENT

Embodiments of the present invention will be described below with reference to the accompanying drawings.

1. First Embodiment

1.1 Overall Configuration of Printing System

Figure 1:
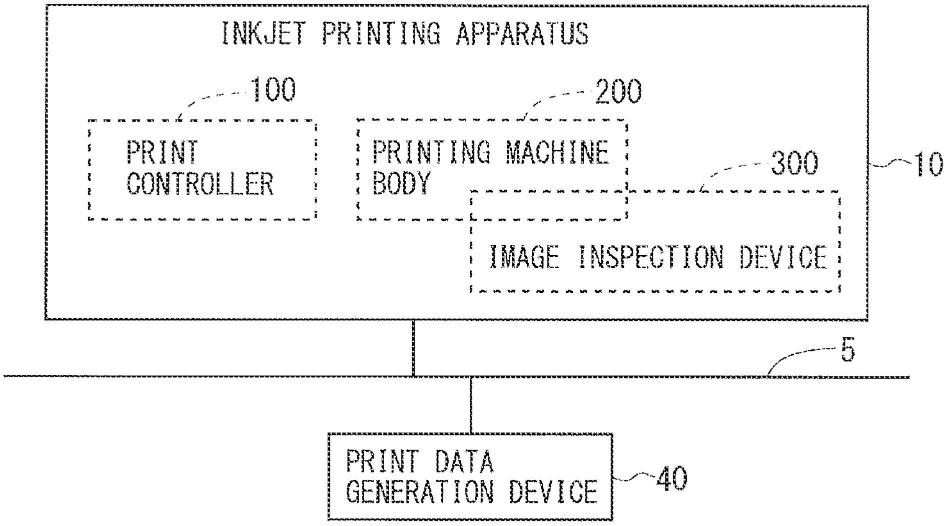
FIG. 1 is an overall configuration diagram of a printing system according to a first embodiment of the present invention.

FIG. 1 is an overall configuration diagram of a printing system according to a first embodiment of the present invention. The printing system includes an inkjet printing apparatus 10 and a print data generation device 40. The inkjet printing apparatus 10 and the print data generation device 40 are connected to each other through a communication line 5. The print data generation device 40 generates print data by performing raster image processor (RIP) processing or the like to submitted data such as a portable document format (PDF) file. The print data generated by the print data generation device 40 is transmitted to the inkjet printing apparatus 10 through the communication line 5. The inkjet printing apparatus 10 outputs a print image to print paper as a print medium based on print data transmitted from the print data generation device 40 without using a printing plate. The inkjet printing apparatus 10 includes a printing machine body 200, a print controller 100 for controlling the operation of the printing machine body 200, and an image inspection device 300 for inspecting a printing state. However, the present invention can also be applied to an inkjet printing apparatus not including the image inspection device 300 (i.e., not having a function of inspecting the printing state).

1.2 Configuration of Inkjet Printing Apparatus

Figure 2:
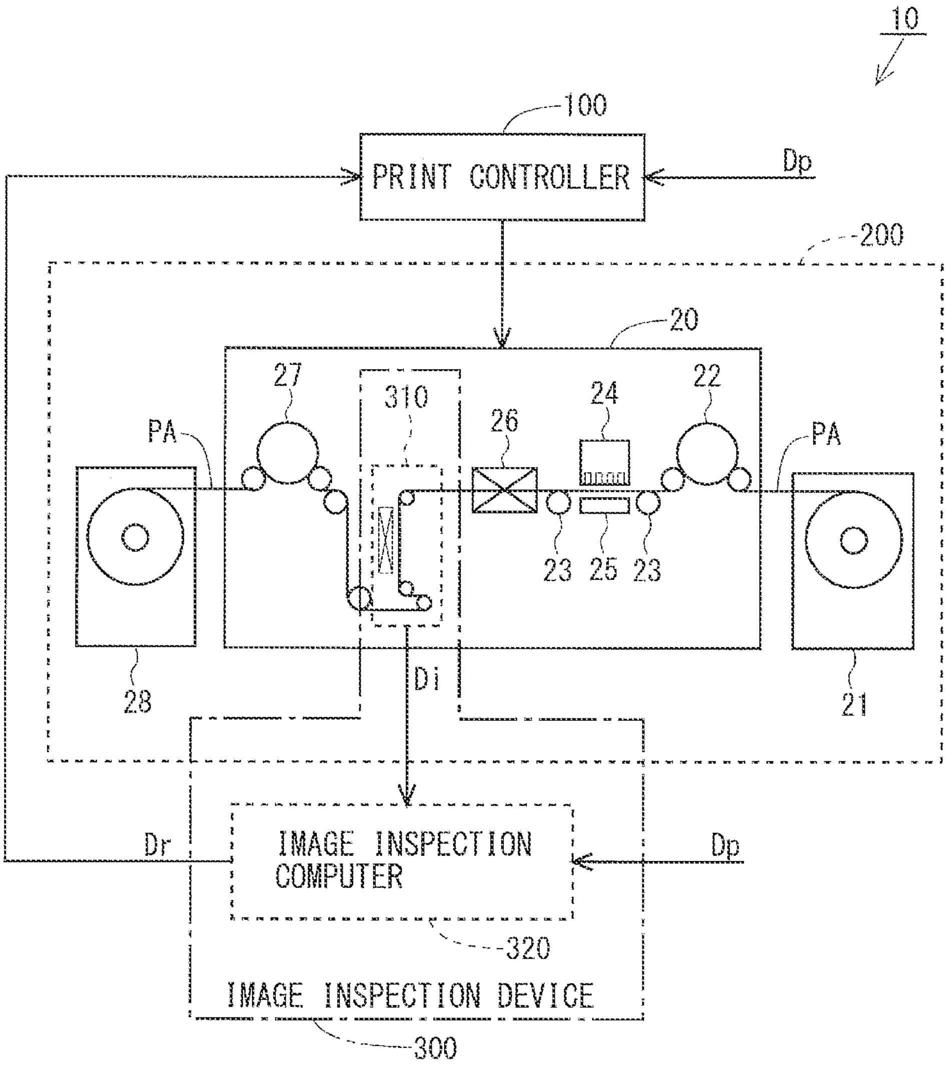
FIG. 2 is a schematic diagram showing a configuration example of an inkjet printing apparatus in the first embodiment.

FIG. 2 is a schematic diagram showing a configuration example of the inkjet printing apparatus 10. As described above, the inkjet printing apparatus 10 includes the print controller 100, the printing machine body 200, and the image inspection device 300.

The printing machine body 200 includes a paper feeding unit 21 for supplying print paper (e.g., roll paper) PA, a printing mechanism 20 for performing printing on the print paper PA, and a paper winding unit 28 for winding the print paper PA after printing. The printing mechanism 20 includes a first drive roller 22 for conveying the print paper PA to the inside, a plurality of support rollers 23 for conveying the print paper PA inside the printing mechanism 20, a printing unit 24 for performing printing by ejecting ink onto the print paper PA, a cleaning mechanism 25 for performing cleaning (e.g., suction of ink from the nozzle or wiping of the nozzle surface) of the printing unit 24, a drying unit 26 for drying the print paper PA after printing, an imaging unit 310 for capturing a print image (print paper PA after printing), and a second drive roller 27 for outputting the print paper PA from the inside of the printing mechanism 20. The imaging unit 310 is a component of the image inspection device 300 and is configured using an image sensor such as a charged coupled device (CCD) or a complementary metal-oxide semiconductor (CMOS).

The print controller 100 controls the operation of the printing machine body 200 having the configuration as above. When a printout instruction command is given to the print controller 100, the print controller 100 controls the operation of the printing machine body 200 so that the print paper PA is conveyed from the paper feeding unit 21 to the paper winding unit 28. Then, first, printing is performed on the print paper PA by the printing unit 24, next, the print paper PA is dried by the drying unit 26, and finally, a print image is captured by the imaging unit 310. Further, the printing unit 24 is cleaned by the cleaning mechanism 25 as necessary.

The image inspection device 300 includes the imaging unit 310 and an image inspection computer 320. Captured image data Di obtained by capturing the print image by the imaging unit 310 is transmitted to the image inspection computer 320. In the image inspection computer 320, for example, the captured image data Di is compared and collated with print data Dp transmitted from the print data generation device 40 to perform an inspection for detecting a defect, and the like. Then, an inspection result Dr obtained by the image inspection computer 320 is transmitted to the print controller 100.

In the present embodiment, a conveyance mechanism is achieved by the paper feeding unit 21, the first drive roller 22, the plurality of support rollers 23, the second drive roller 27, and the paper winding unit 28, and the print controller 100 is provided with a conveyance control unit (not shown in FIG. 2) for controlling a conveyance speed that is a distance by which the print paper PA is conveyed per unit time by the conveyance mechanism.

Figure 3:
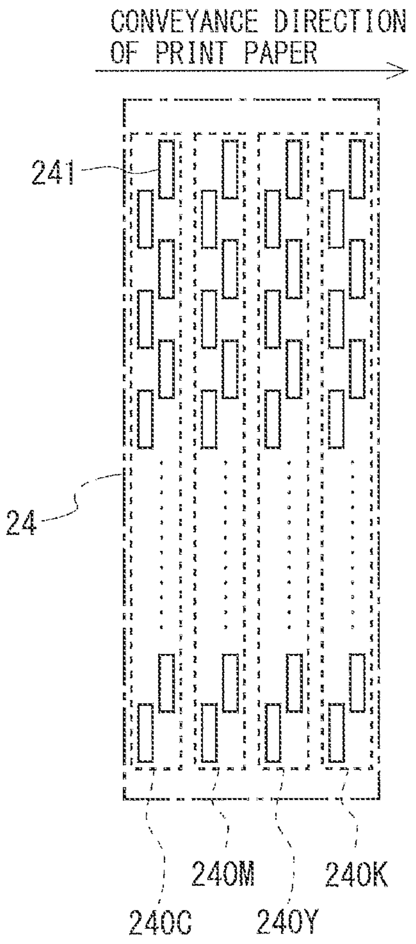
FIG. 3 is a plan view showing a configuration example of a printing unit in the first embodiment.

FIG. 3 is a plan view showing a configuration example of the printing unit 24. As shown in FIG. 3, the printing unit 24 includes inkjet head rows 240C, 240M, 240Y, and 240K of cyan color (C color), magenta color (M color), yellow color (Y color), and black color (K color) arranged in a row in the conveyance direction of the print paper PA. Each inkjet head row includes a plurality of inkjet heads (print heads) 241 arranged in a zigzag shape. Each inkjet head 241 includes many nozzles for ejecting ink. Each nozzle of the inkjet heads 241 included in the C-color inkjet head row 240C ejects the C-color ink, each nozzle of the inkjet heads 241 included in the M-color inkjet head row 240M ejects the M-color ink, each nozzle of the inkjet heads 241 included in the Y-color inkjet head row 240Y ejects the Y-color ink, and each nozzle of the inkjet heads 241 included in the K-color inkjet head row 240K ejects the K-color ink.

Figure 4:
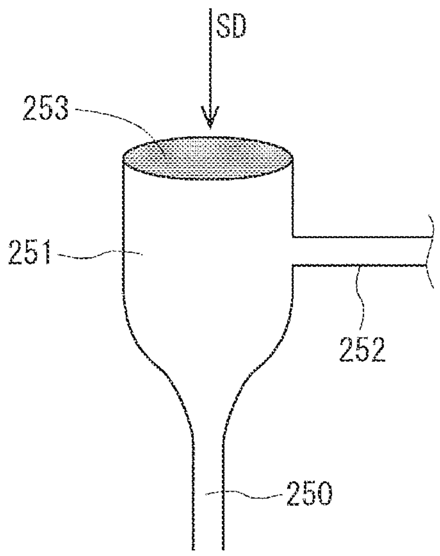
FIG. 4 is a diagram for explaining components corresponding to one nozzle in the first embodiment.

FIG. 4 is a diagram for explaining components corresponding to one nozzle. As shown in FIG. 4, an ink chamber 251 in which ink is accumulated, an ink supply path 252 for supplying ink to the ink chamber 251, and a piezoelectric element 253 for applying pressure to the ink inside the ink chamber 251 are provided corresponding to a nozzle 250. In such a configuration, when a drive signal SD with a predetermined drive waveform is applied to the piezoelectric element 253, the piezoelectric element 253 is deformed based on the drive signal SD. As a result, the ink inside the ink chamber 251 is pressurized, and the ink is ejected from the nozzle 250.

1.3 Hardware Configuration of Print Control Device

Figure 5:
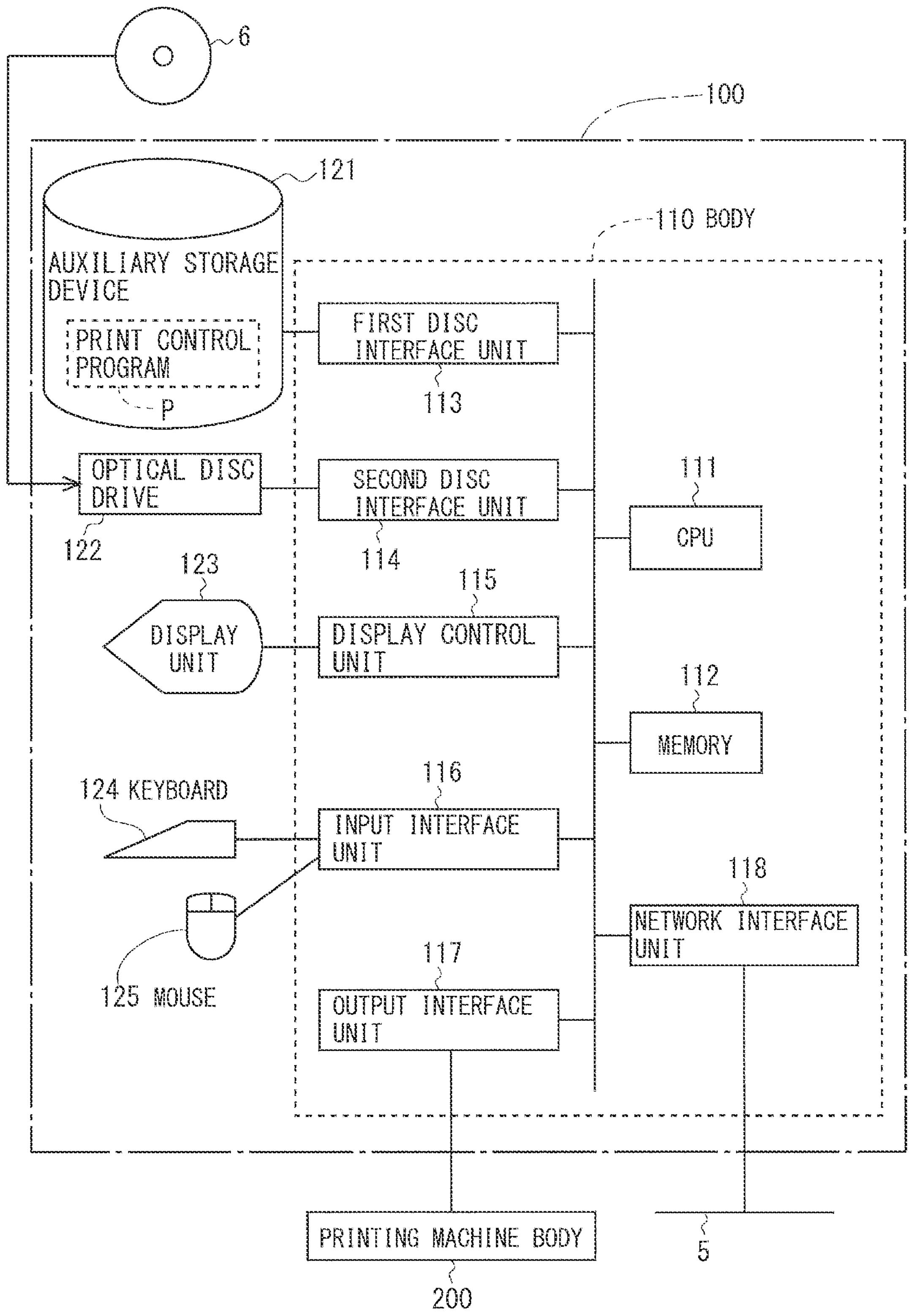
FIG. 5 is a block diagram showing a hardware configuration of a print controller in the first embodiment.

FIG. 5 is a block diagram showing a hardware configuration of the print controller 100. As shown in FIG. 5, the print controller 100 includes a body 110, an auxiliary storage device 121, an optical disc drive 122, a display unit 123, a keyboard 124, a mouse 125, and the like. The body 110 includes a central processing unit (CPU) 111, a memory 112, a first disc interface unit 113, a second disc interface unit 114, a display control unit 115, an input interface unit 116, an output interface unit 117, and a network interface unit 118. The CPU 111, the memory 112, the first disc interface unit 113, the second disc interface unit 114, the display control unit 115, the input interface unit 116, the output interface unit 117, and the network interface unit 118 are connected to each other via a system bus. The auxiliary storage device 121 is connected to the first disc interface unit 113. An optical disc drive 122 is connected to the second disc interface unit 114. The display unit (display device) 123 is connected to the display control unit 115. The keyboard 124 and the mouse 125 are connected to the input interface unit 116. The printing machine body 200 is connected to the output interface unit 117 via a communication cable. The communication line 5 is connected to the network interface unit 118. The auxiliary storage device 121 is a magnetic disk device or the like. An optical disc 6 as a computer-readable recording medium such as a compact disc read-only memory (CD-ROM) or a digital versatile disc (DVD)-ROM is inserted into the optical disc drive 122. The display unit 123 is a liquid crystal display or the like. The display unit 123 is used to display information desired by the operator. The keyboard 124 and the mouse 125 are used by the operator to input instructions to the print controller 100.

The auxiliary storage device 121 stores a print control program (a program for controlling the execution of the printing process by the printing machine body 200) P. The CPU 111 reads the print control program P stored in the auxiliary storage device 121 into the memory 112 and executes the program to achieve various functions of the print controller 100. The memory 112 includes a random-access memory (RAM) and a read-only memory (ROM). The memory 112 functions as a work area for the CPU 111 to execute the print control program P stored in the auxiliary storage device 121. Note that the print control program P is provided by being stored into the computer-readable recording medium (non-transitory recording medium). That is, for example, the user purchases the optical disc 6 as the recording medium of the print control program P, inserts the optical disc 6 into the optical disc drive 122, reads the print control program P from the optical disc 6, and installs the print control program P in the auxiliary storage device 121. Alternatively, the print control program P transmitted via the communication line 5 may be received by the network interface unit 118 and installed in the auxiliary storage device 121.

1.4 Waveform Data Control Processing

1.4.1 Overview

In the inkjet printing apparatus 10 according to the present embodiment, waveform data control processing, which is a processing of giving a drive signal SD with a waveform (drive waveform) corresponding to the attribute of the print job to the inkjet head 241, is performed. In the present embodiment, by the waveform data control processing, the waveform of the drive signal SD is determined for each ink color in accordance with the print rate obtained based on the print data constituting the print job, and the drive signal SD with the determined waveform is given to the inkjet head 241.

Meanwhile, a conveyance speed (a speed at which the conveyance mechanism conveys the print paper PA) suitable for drying the print paper PA after printing (drying by the drying unit 26) varies depending on the print rate. In addition, it is necessary to switch the waveform of the drive signal SD between a case where printing is executed at a high conveyance speed and a case where printing is executed at a low conveyance speed. Therefore, in the present embodiment, the waveform data for the drive signal SD corresponding to the high conveyance speed and the waveform data for the drive signal SD corresponding to the low conveyance speed are prepared in advance for each ink color, and the drive signal SD generated by the waveform data selected in accordance with the print rate is given to the inkjet head 241 for each ink color.

1.4.2 Configuration Related to Driving of Inkjet Head

Figure 6:
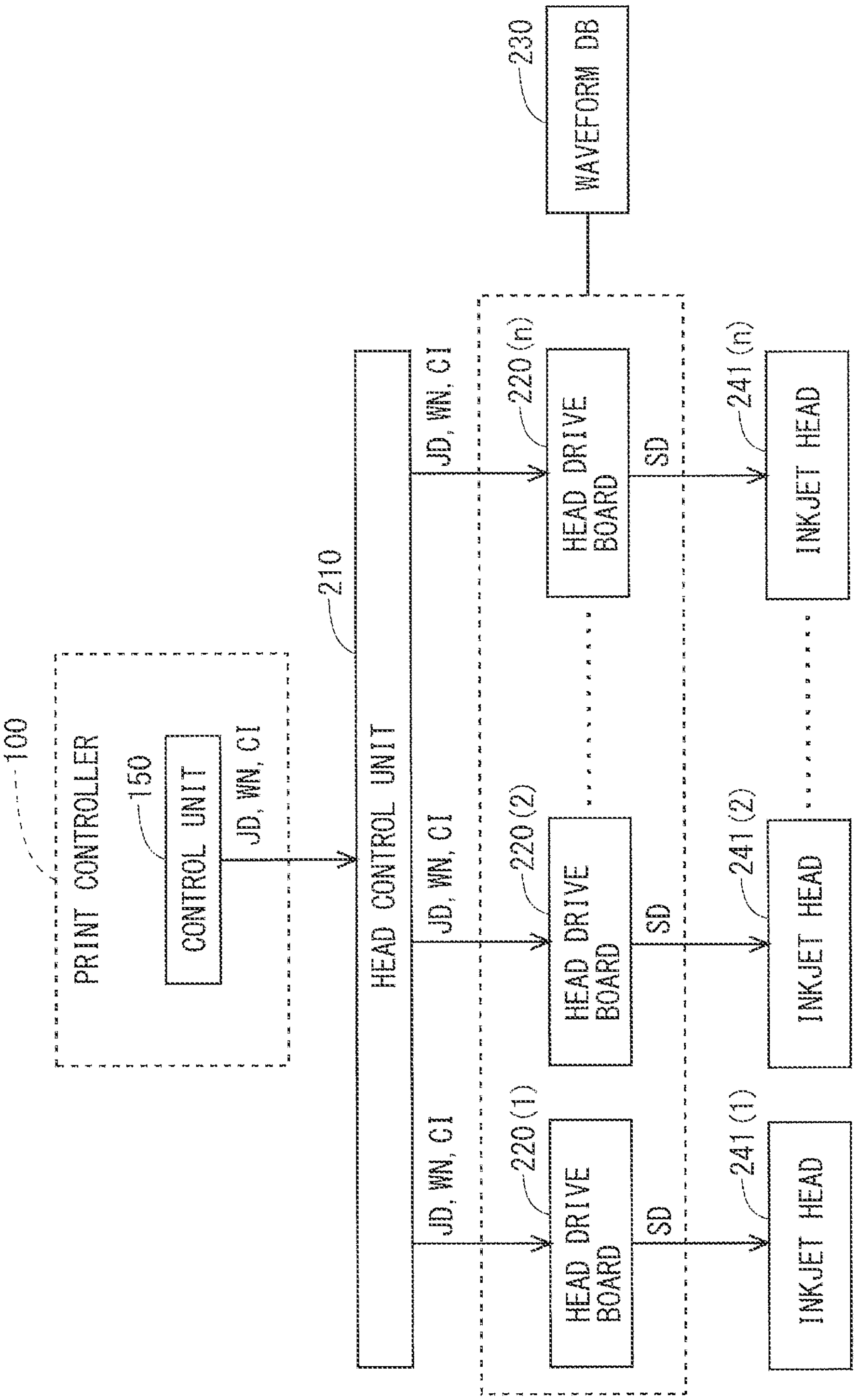
FIG. 6 is a block diagram for explaining a configuration related to the driving of inkjet heads in the first embodiment.

FIG. 6 is a block diagram for explaining a configuration related to the driving of the inkjet heads 241 (a configuration related to the waveform data control processing). It is assumed that n (n is an integer) inkjet heads 241(1) to 241(*n*) are provided in the inkjet printing apparatus 10. The n inkjet heads 241(1) to 241(*n*) include a C-color inkjet head 241, an M-color inkjet head 241, a Y-color inkjet head 241, and a K-color inkjet head 241.

As shown in FIG. 6, the inkjet printing apparatus 10 includes, as components for driving the inkjet heads 241, a control unit 150 achieved by executing the print control program P in the print controller 100, a head control unit (control board) 210, head drive boards 220(1) to 220(*n*) corresponding one-to-one to the n inkjet heads 241(1) to 241(*n*), and a waveform DB (database) 230.

First, the waveform DB 230 will be described. In the present embodiment, the waveform DB 230 is provided in common for the n head drive boards 220(1) to 220(*n*). The waveform DB 230 is achieved by a memory such as a ROM, for example, and is accessible from the n head drive boards 220(1) to 220(*n*). The waveform DB 230 stores a plurality of pieces of waveform data representing the respective waveforms of the plurality of drive signals SD. Note that the waveform DB 230 is provided in common for the n head drive boards 220(1) to 220(*n*) instead of being provided for each head drive board 220, thereby suppressing an increase in circuit scale due to the provision of the waveform DB 230.

FIG. 7 is a diagram for explaining data stored in the waveform DB 230 according to the present embodiment. As can be grasped from FIG. 7, each record in the waveform DB 230 includes a waveform number and waveform data. That is, each waveform data is specified by a waveform number. In the present embodiment, as shown in FIG. 7, eight records are stored in the waveform DB 230. For example, regarding a record indicated by an arrow denoted by reference numeral 71 in FIG. 7, the waveform number is 2, and the waveform data is data representing a waveform suitable for high-speed printing for M color. It can be grasped from FIG. 7 that two records are stored in the waveform DB 230 for each ink color. More specifically, waveform data representing a waveform suitable for high-speed printing and waveform data representing a waveform suitable for low-speed printing are stored in the waveform DB 230 for each ink color.

FIG. 8 is a diagram showing another example of the data stored in the waveform DB 230. As shown in FIG. 8, various pieces of waveform data each corresponding to the type of the image to be printed by the execution of the print job can be stored in the waveform DB 230. For example, regarding a record indicated by an arrow denoted by reference numeral 72 in FIG. 8, the waveform number is 0, and the waveform data is data representing a waveform with which no satellite drop occurs (a waveform suitable for an image with many characters).

In order to transmit data for identifying the waveform data instead of transmitting the waveform data itself from the print controller 100 to each head drive board 220 via the head control unit 210, a reference table as shown in FIG. 9 in which the ink color, the conveyance speed, and the waveform number (data for identifying the waveform data) are associated with each other is prepared. The reference table is stored in the auxiliary storage device 121 of the print controller 100 or the memory 112 thereof.

Regarding the components shown in FIG. 6, for each print job, the control unit 150 analyzes the print data to obtain the print rate, and acquires a waveform number WN for specifying the waveform data used at the time of printing each ink color by referring to the reference table described above based on the conveyance speed (high speed or low speed) determined in accordance with the print rate. Then, for each print job, the control unit 150 associates the waveform number WN and control-related information CI with job data JD constituting the print job and transmits the job data JD, the waveform number WN, and the control-related information CI to the head control unit 210. Note that the control-related information CI is information necessary for appropriately controlling the waveform data. In the present embodiment, since a different waveform number WN is associated with the job data JD for each ink color, information that associates at least each waveform number WN with a number (head number) for identifying the inkjet head 241 is transmitted as the control-related information CI from the control unit 150 to the head control unit 210. Thus, for example, the drive signal generated by the waveform data specified by waveform number "2" (cf. FIG. 7) is correctly given to the M-color inkjet head 241. Further, the job data JD includes various types of information (e.g., paper size information) necessary for the execution of printing in addition to the print data representing the image to be printed.

The head control unit 210 receives the job data JD, the waveform number WN, and the control-related information CI transmitted from the control unit 150 for each print job. Then, the head control unit 210 transfers the received data (job data JD, waveform number WN, and control-related information CI) to the n head drive boards 220(1) to 220(*n*) for each print job. At that time, the head control unit 210 outputs only necessary data among the received data to each head drive board 220. In this manner, the waveform number WN and the control-related information CI are set to each head drive board 220.

Each head drive board 220 extracts waveform data from the waveform DB 230 based on the set waveform number WN, and gives a drive signal SD with a waveform represented by the extracted waveform data to the inkjet head 241 based on the print data included in the job data JD while referring to the control-related information CI. Meanwhile, the waveform number WN and the control-related information CI are held on each head drive board 220 in a first-in first-out (FIFO) mode. That is, when the print job to be executed is switched, each head drive board 220 gives the drive signal SD to the corresponding inkjet head 241 using the earliest held data among the accumulated data.

As described above, each inkjet head 241 includes many nozzles 250 that eject ink. As shown in FIG. 4, the ink chamber 251, the ink supply path 252, and the piezoelectric element 253 are provided corresponding to each nozzle 250. Then, the piezoelectric element 253 is deformed based on the drive signal SD given from the head drive board 220 to the inkjet head 241, whereby the ink is ejected from the nozzle 250.

In the present embodiment, a waveform data holding unit is achieved by the waveform DB 230, an ink ejection unit is achieved by the n inkjet heads 241(1) to 241(*n*), a drive control unit is achieved by the head control unit 210, and a driving unit is achieved by the n head drive boards 220(1) to 220(*n*). An ejection control unit is achieved by the head control unit 210 and the n head drive boards 220(1) to 220(*n*). Waveform identification data is achieved by the waveform number WN.

1.4.3 Functional Configuration of Control Unit

Figure 10:
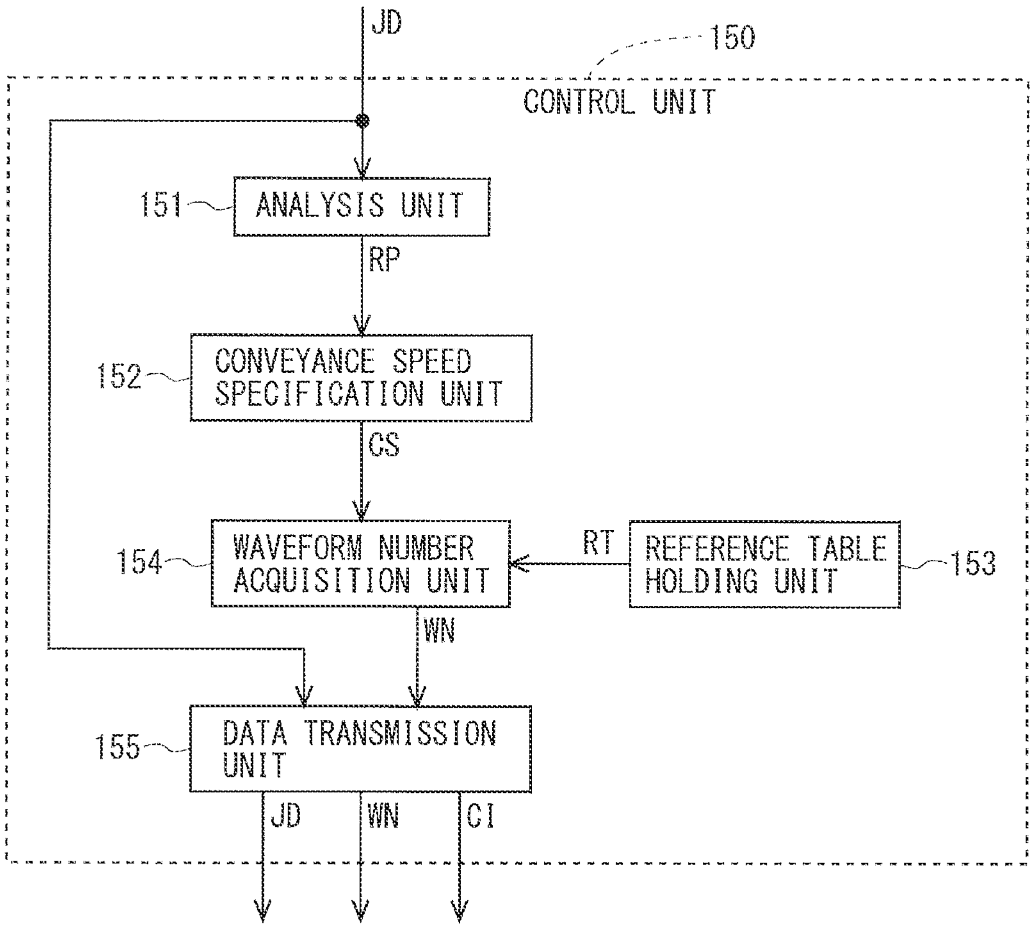
FIG. 10 is a block diagram showing a schematic functional configuration of a control unit in the first embodiment.

FIG. 10 is a block diagram showing a schematic functional configuration of the control unit 150 achieved by executing the print control program P by the print controller 100. Note that FIG. 10 shows only components related to the waveform data control processing. The control unit 150 includes an analysis unit 151, a conveyance speed specification unit 152, a reference table holding unit 153, a waveform number acquisition unit 154, and a data transmission unit 155. A plurality of pieces of job data JD corresponding to a plurality of print jobs designated by the operator, respectively, are sequentially given to the control unit 150.

The analysis unit 151 analyzes the print data included in the job data JD to obtain a print rate RP. As a method for obtaining the print rate from the print data, a known method can be used. The conveyance speed specification unit 152 specifies a conveyance speed CS suitable for executing the corresponding print job based on the print rate RP obtained by the analysis unit 151. Note that, a specific speed is not specified as the conveyance speed, but rather either "high speed" or "low speed" is specified. In the present embodiment, a threshold is set in advance, and the conveyance speed CS is set to "low speed" when the print rate RP is equal to or greater than the threshold, and the conveyance speed CS is set to "high speed" when the print rate RP is less than the threshold. The reason why such a setting is made is that when printing is performed at high speed in a case where the print rate is high, the drying of the printed print paper by the drying unit 26 or the supply of ink to the inkjet head 241 may not be in time.

The reference table holding unit 153 holds a reference table RT shown in FIG. 9. The waveform number acquisition unit 154 acquires the waveform number WN for each ink color by referring to the reference table RT based on the conveyance speed CS specified by the conveyance speed specification unit 152. For example, when the conveyance speed CS specified by the conveyance speed specification unit 152 is "low speed", "1" is acquired as the waveform number WN for the C-color, "3" is acquired as the waveform number WN for the M-color, "5" is acquired as the waveform number WN for the Y-color, and "7" is acquired as the waveform number WN for the K-color. Since the waveform number WN and the waveform data are associated in the waveform DB 230 (cf. FIG. 7), each print job is associated with the waveform data stored in the waveform DB 230 via the waveform numbers WN for each ink color. That is, substantially, the waveform number acquisition unit 154 associates each print job with one of the plurality of pieces of waveform data for each ink color.

The data transmission unit 155 transmits the job data JD, the waveform number WN, and the control-related information CI to the head control unit 210 for each print job.

In the present embodiment, an attribute acquisition unit is implemented by the analysis unit 151 and the conveyance speed specification unit 152, a print rate calculation unit is implemented by the analysis unit 151, and an association unit is implemented by the waveform number acquisition unit 154.

1.4.4 Processing Procedure

Figure 11:
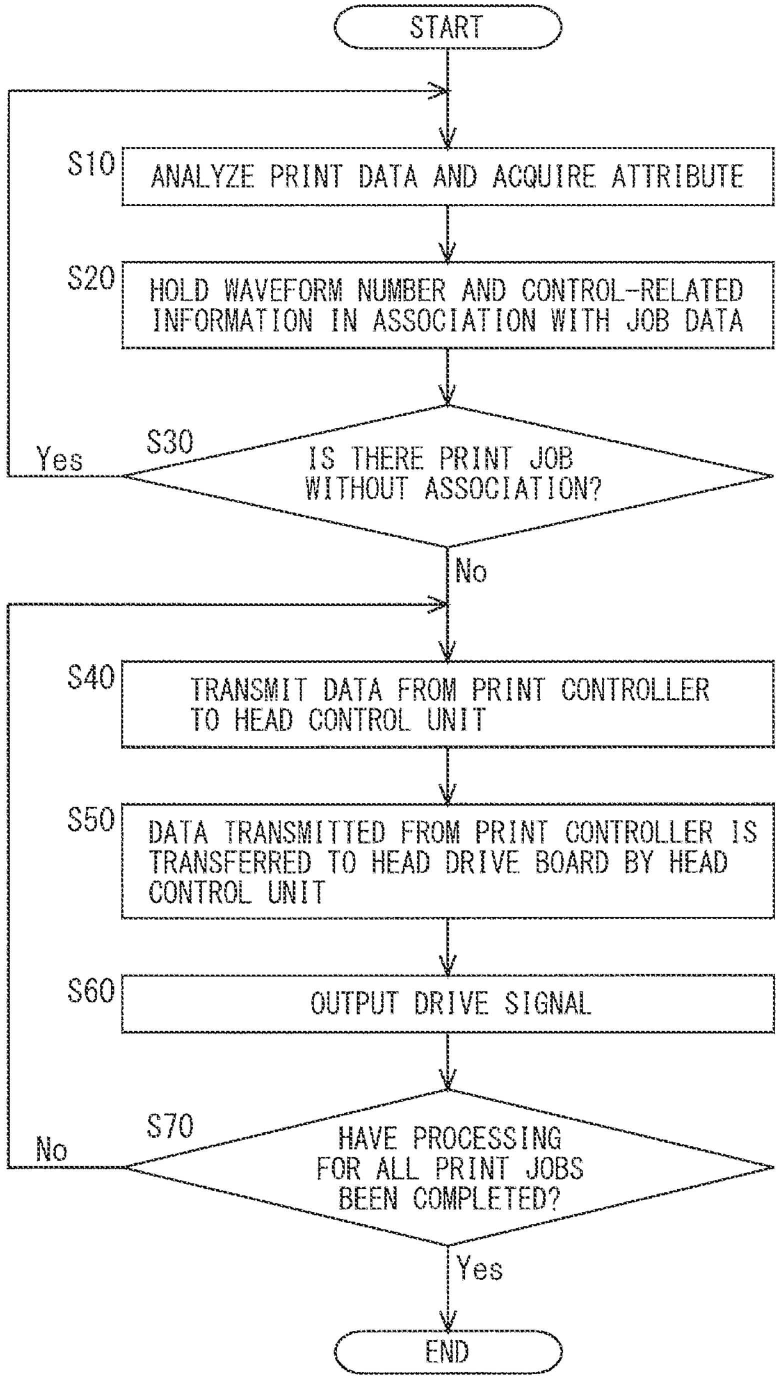
FIG. 11 is a flowchart showing a procedure of waveform data control processing in the first embodiment.

FIG. 11 is a flowchart showing the procedure of the waveform data control processing. Note that, typically, this processing is started when an operator presses a print start button displayed on the display unit 123 (cf. FIG. 5) of the print controller 100 after selecting a plurality of print jobs for executing print output.

After the start of the waveform data control processing, processing of analyzing the print data and acquiring the attribute of the print job based on the analysis result is performed (step S10). Specifically, in step S10, first, the analysis unit 151 analyzes print data constituting the print job to be processed (specifically, the print data included in the job data JD corresponding to the print job to be processed). As a result, the print rate RP is obtained. Then, the conveyance speed CS is specified by the conveyance speed specification unit 152 based on the print rate RP. As above, in the present embodiment, in step S10, the conveyance speed CS (high speed or low speed) is acquired as the attribute of the print job.

After the completion of step S10, the waveform number acquisition unit 154 acquires the waveform number WN by referring to the reference table RT based on the specified conveyance speed CS, and the acquired waveform number WN and the control-related information CI are held while being associated with the job data JD (step S20). Although the waveform number acquisition unit 154 acquires the waveform number WN based on the conveyance speed CS in the present embodiment, the waveform number acquisition unit 154 may acquire the waveform number WN based on the print rate RP. That is, the print rate RP may be acquired as the attribute of the print job.

After the completion of step S20, it is determined whether there is a print job without the association of the waveform number WN and the control-related information CI with the job data JD (i.e., a print job for which the processing in steps S10 and S20 has not been performed) (step S30). As a result of the determination, when there is a print job without the association, the processing returns to step S10, and when there is no print job without the association, the processing proceeds to step S40. Note that the processing in steps S10 to S30 is repeated the same number of times as the number of print jobs for which execution of print output has been selected.

In step S40, data (Job data JD, waveform number WN, and control-related information CI) corresponding to the print job that is the next execution target (print target) is transmitted from the print controller 100 to the head control unit 210.

Thereafter, the head control unit 210 transfers the data (job data JD, waveform number WN, and control-related information CI) transmitted from the print controller 100 to the head drive board 220 (step S50). Note that, in the present embodiment, the n head drive boards 220(1) to 220(*n*) are provided, and hence the corresponding data is transmitted to each of the n head drive boards 220(1) to 220(*n*). As a result, the waveform number WN and the control-related information CI are set to each head drive board 220.

After the completion of step S50, each head drive board 220 extracts waveform data from the waveform DB 230 based on the set waveform number WN and gives the drive signal SD with the waveform represented by the extracted waveform data to the inkjet head 241 (step S60). Thus, in each inkjet head 241, the ink is ejected from the nozzle 250 based on the given drive signal SD.

Thereafter, it is determined whether or not the processing (the processing in steps S40 to S60) for all the print jobs has been completed (step S70). As a result of the determination, when there is an unprocessed print job, the processing returns to step S40, and when there is no unprocessed print job, the waveform data control processing is completed. Note that the processing in steps S40 to S70 is repeated the same number of times as the number of print jobs for which execution of print output has been selected.

In the present embodiment, an association step is achieved by the step S20, and an ejection control step is achieved by the step S60.

Here, it is assumed that two print jobs (job X and job Y) are selected as the print jobs to be executed, the print rate RP of job X is equal to or greater than the threshold, and the print rate RP of job Y is less than the threshold. In this case, at the time of executing job X, the drive signals SD with the waveforms generated by the pieces of waveform data specified by the waveform numbers "1", "3", "5", and "7" are given to the C-color inkjet head 241, the M-color inkjet head 241, the Y-color inkjet head 241, and the K-color inkjet head 241, respectively, and at the time of executing job Y, the drive signals SD with the waveforms generated by the pieces of waveform data specified by the waveform numbers "0", "2", "4", and "6" are given to the C-color inkjet head 241, the M-color inkjet head 241, the Y-color inkjet head 241, and the K-color inkjet head 241, respectively. Thus, the drive signal SD with the waveform suitable for printing is given to each inkjet head 241 in accordance with the print rate RP of the print job.

In the present embodiment, each print job is associated with one of a plurality of pieces of waveform data for each ink color. In this regard, the configuration may be such that each print job is associated with one of the plurality of pieces of waveform data for each inkjet head 241 in the control unit 150. In this case, the n head drive boards 220(1) to 220(*n*) give drive signals SD with waveforms corresponding to the pieces of waveform data associated by the control unit 150 to the inkjet heads 241(1) to 241(*n*), respectively. Further, the configuration may be such that each print job is associated with one of the plurality of pieces of waveform data for each nozzle 250 in the control unit 150. In this case, to each inkjet head 241, a plurality of drive signals SD respectively corresponding to the plurality of nozzles 250 included therein are given so that the ink is ejected from each nozzle 250 based on the drive signal SD with the waveform corresponding to the waveform data associated by the control unit 150. By associating each nozzle 250 with the waveform data in this manner, it is possible to improve the print quality of each printed matter in addition to reducing variations in print quality among a plurality of print jobs.

1.5 Effects

According to the present embodiment, the inkjet printing apparatus 10 is provided with the waveform DB 230 that holds a plurality of pieces of waveform data representing the respective waveforms of the plurality of drive signals SD for driving the inkjet head 241. The print rate RP is obtained based on the print data, and the conveyance speed CS suitable for printing is specified from the print rate RP, for each print job. Then, the waveform data associated with the specified conveyance speed CS is extracted from the waveform DB 230, and the ink is ejected from each nozzle 250 of the inkjet head 241 based on the drive signal SD generated by the extracted waveform data. Specifically, when the print rate RP is equal to or greater than the threshold, the conveyance speed CS is set to a low speed, and the ink is ejected from each nozzle 250 based on the drive signal SD with the waveform suitable for low-speed printing. When the print rate RP is less than the threshold, the conveyance speed CS is set to a high speed, and the ink is ejected from each nozzle 250 based on the drive signal SD with the waveform suitable for high-speed printing. This prevents a decrease in print quality due to that the drying of the printed print paper by the drying unit 26 or the supply of ink to the inkjet head 241 is not in time, regardless of the print rate RP of the print job. That is, printed matter of sufficient quality can be obtained regardless of the print rate RP of the print job. As a result, the necessity of reprinting is reduced as compared to the related art, thus enabling a reduction in the amounts of print paper PA and ink consumed. In this way, it is possible to contribute to the achievement of the Sustainable Development Goals (SDGs). As above, according to the present embodiment, the inkjet printing apparatus 10 capable of reducing variations in print quality as compared to the related art is achieved.

2. Second Embodiment

2.1 Overview

In the first embodiment described above, the waveform (drive waveform) with the drive signal SD given to the inkjet head 241 at the time of printing has been determined for each ink color based on the print rate RP of the print job (more specifically, based on whether the conveyance speed CS determined in accordance with the print rate RP of the print job is high or low). In contrast, in the present embodiment, the waveform of the drive signal SD given to the inkjet head 241 at the time of printing is determined for each image area based on the content of the image to be printed by the execution of the print job. Hereinafter, the differences from the first embodiment will be mainly described.

2.2 Configuration

FIG. 12 is a diagram for explaining data stored in the waveform DB 230 according to the present embodiment. The waveform DB 230 according to the present embodiment stores waveform data representing a waveform suitable for printing for each type of the image to be printed by the execution of a print job. Similarly to the first embodiment, each record of the waveform DB 230 includes a waveform number and waveform data. For example, regarding a record indicated by an arrow denoted by reference numeral 74 in FIG. 12, the waveform number is 1, and the waveform data is data representing a waveform suitable for printing a line.

FIG. 13 is a diagram for explaining a reference table in the present embodiment. As can be grasped from FIG. 13, in this reference table, the image type and the waveform number are associated with each other.

Figure 14:
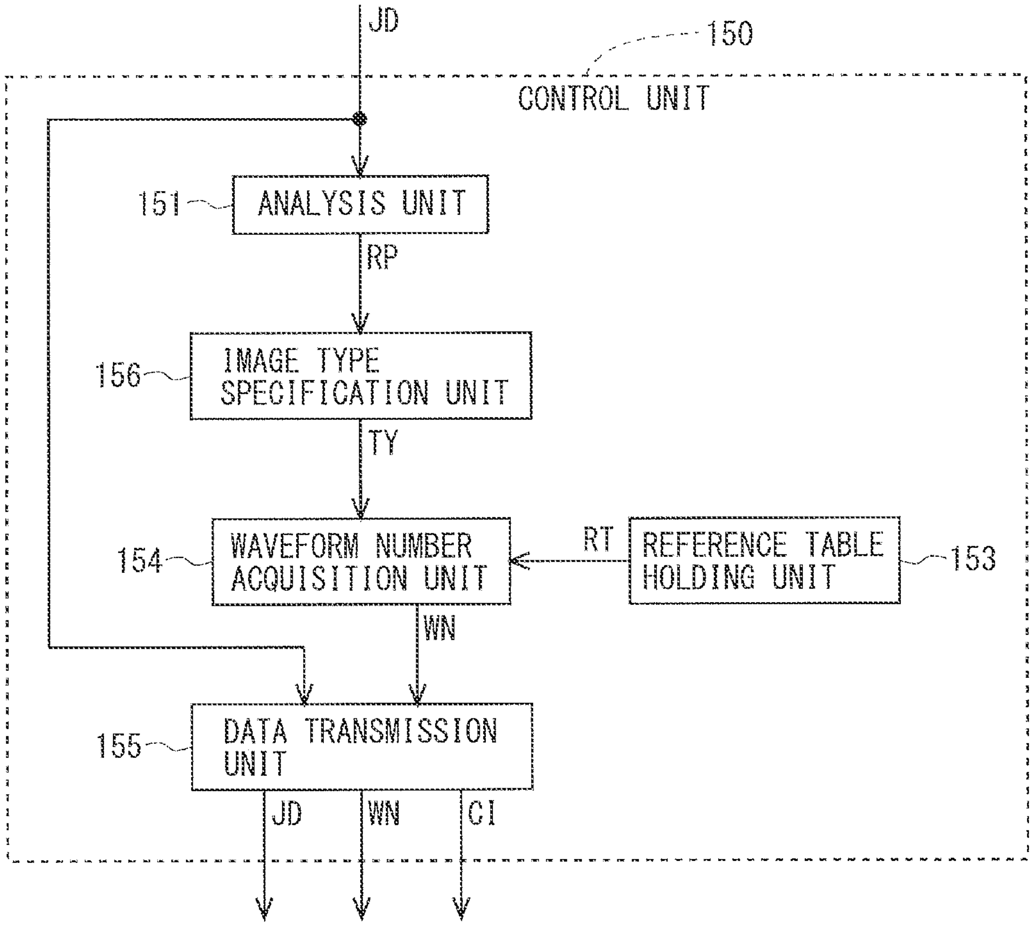
FIG. 14 is a block diagram showing a schematic functional configuration of a control unit in the second embodiment.

FIG. 14 is a block diagram showing a schematic functional configuration of the control unit 150 according to the present embodiment. The control unit 150 in the present embodiment includes an image type specification unit 156 instead of the conveyance speed specification unit 152 in the first embodiment.

Similarly to the first embodiment, the analysis unit 151 analyzes the print data included in the job data JD to obtain the print rate RP. The image type specification unit 156 specifies the image type TY for each image area based on the print rate RP obtained by the analysis unit 151. The reference table holding unit 153 holds the reference table RT shown in FIG. 13. The waveform number acquisition unit 154 acquires the waveform number WN by referring to the reference table RT based on the image type TY specified by the image type specification unit 156 for each image area. For example, regarding a certain image area, when the image type TY specified by the image type specification unit 156 is "picture", "2" is acquired as the waveform number WN. The data transmission unit 155 transmits the job data JD, the waveform number WN, and the control-related information CI to the head control unit 210 for each print job. In this regard, in the present embodiment, information for specifying the position of each image area, information for specifying the nozzle 250 corresponding to each image area, and information for associating each waveform number WN with the position of the image area are transmitted to the head control unit 210 as the control-related information CI.

Here, specifying the image type TY for each image area will be described with reference to FIG. 15. Regarding FIG. 15, it is assumed that a region denoted by reference numeral 60 is a print area corresponding to one print job. Further, it is assumed that the print area is divided into five image areas 601 to 605 based on the print data constituting the print job. In this case, for each of the five image areas 601 to 605, the image type TY is specified based on the print rate of the corresponding region. As a result of the identification of the image type TY, for example, when the image type of the image area 601 is a character, the image type of the image area 602 is a picture, the image type of the image area 603 is a character, the image type of the image area 604 is a line, and the image type of the image area 605 is a picture, waveform number "0" is associated with the image area 601, waveform number "2" is associated with the image area 602, waveform number "0" is associated with the image area 603, waveform number "1" is associated with the image area 604, and waveform number "2" is associated with the image area 605.

2.3 Waveform Data Control Processing

The procedure of the waveform data control processing in the present embodiment will be described with reference to FIG. 11. After the start of the waveform data control processing, processing of analyzing the print data and acquiring the attribute of the print job based on the analysis result is performed (step S10). In the present embodiment, the image type TY (the type of the image represented by printing based on the print data) for each image area is acquired as the attribute of the print job based on the print rate RP as the analysis result of the print data.

After the completion of step S10, for each image area, the waveform number acquisition unit 154 acquires the waveform number WN by referring to the reference table RT based on the image type TY, and the acquired waveform number WN and the control-related information CI are held in association with the job data JD (step S20). Steps S30 and S40 are the same as those in the first embodiment.

After the completion of step S40, the head control unit 210 transfers the data (Job data JD, waveform number WN, and control-related information CI) transmitted from the print controller 100 to the head drive board 220 (step S50). In this regard, in the first embodiment, one waveform number WN has been transmitted to one head drive board 220 for each print job. In contrast, in the present embodiment, for each print job, a plurality of waveform numbers WN may be transmitted to one head drive board 220. For example, in a case in which a region where ink is ejected from the inkjet head 241 corresponding to one head drive board 220 is divided into three image areas where different types of images are printed, three waveform numbers WN are transmitted from the head control unit 210 to the head drive board 220. Further, information specifying which of the three waveform numbers WN each nozzle corresponds to is transmitted as the control-related information CI from the head control unit 210 to the head drive board 220.

After the completion of step S50, each head drive board 220 extracts waveform data from the waveform DB 230 based on the set waveform number WN and gives a drive signal SD with the waveform represented by the extracted waveform data to the inkjet head 241 for each image area (step S60). Thus, in each inkjet head 241, the ink is ejected from the nozzle 250 based on the given drive signal SD for each image area. Step S70 is the same as that in the first embodiment.

Figure 15:
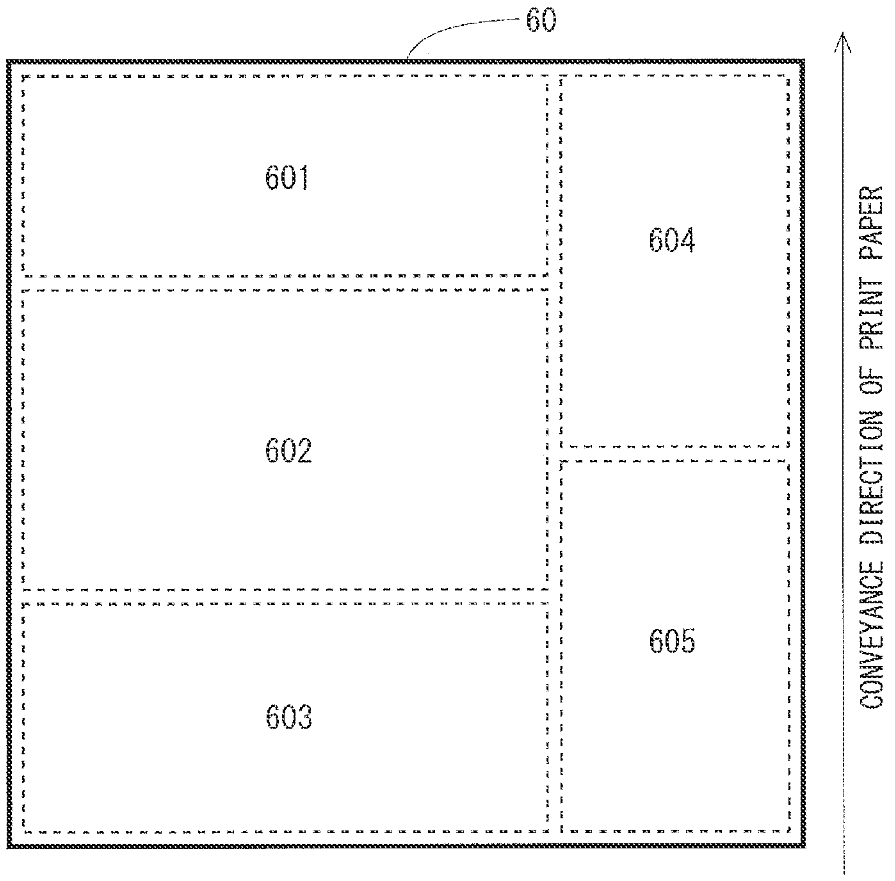
FIG. 15 is a diagram for explaining the specification of the type of an image for each image area in the second embodiment.

Here, regarding FIG. 15, as described above, it is assumed that the image type TY of the image area 601 is a character, the image type TY of the image area 602 is a picture, the image type TY of the image area 603 is a character, the image type TY of the image area 604 is a line, and the image type TY of the image area 605 is a picture. In this case, when printing is performed on the image area 601, the drive signal SD with the waveform suitable for printing a character is given to the corresponding inkjet head 241, when printing is performed on the image area 602, the drive signal SD with the waveform suitable for printing a picture is given to the corresponding inkjet head 241, when printing is performed on the image area 603, the drive signal SD with the waveform suitable for printing a character is given to the corresponding inkjet head 241, when printing is performed on the image area 604, the drive signal SD with the waveform suitable for printing a line is given to the corresponding inkjet head 241, and when printing is performed on the image area 605, the drive signal SD with the waveform suitable for printing a picture is given to the corresponding inkjet head 241. Thus, the drive signal SD with the waveform suitable for printing is given to each inkjet head 241 in accordance with the image type TY of the image to be printed.

Note that, although waveform data is prepared for each image type in the present embodiment, waveform data may be prepared for each ink color and for each image type. In this case, drive signals SD with waveforms different from each other are given to the inkjet heads 241 of four colors that perform printing on a certain image area.

2.4 Effects

According to the present embodiment, for each print job, the print rate RP is obtained based on the print data, and the image type TY is specified for each image area from the print rate RP. Then, the waveform data associated with the specified image type TY is extracted from the waveform DB 230, and the ink is ejected from each nozzle 250 of the inkjet head 241 based on the drive signal SD generated by the extracted waveform data. As a result, the image quality can be optimized for each image type TY. That is, a change in the print quality depending on the image type TY is prevented. As above, according to the present embodiment, similarly to the first embodiment, the inkjet printing apparatus 10 capable of reducing variations in print quality as compared to the related art is achieved.

3. Third Embodiment

3.1 Overview

In the present embodiment, in order to more finely adjust the waveform of the drive signal SD given to the inkjet head 241, a waveform data correction unit for correcting the waveform data stored in the waveform DB 230 is provided. Then, the drive signal SD with the waveform represented by the waveform data corrected by the waveform data correction unit is given to the inkjet head 241.

3.2 Configuration and Operation

Figure 16:
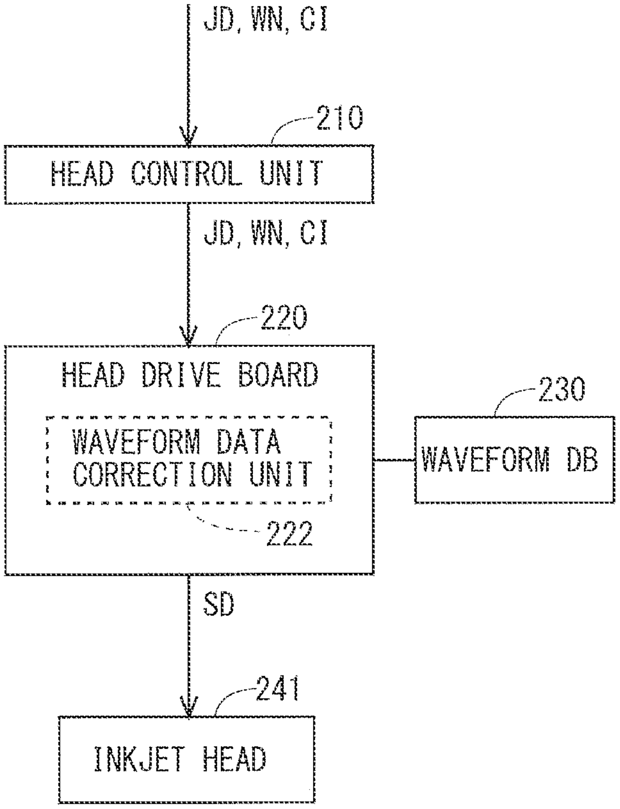
FIG. 16 is a block diagram for explaining a waveform data correction unit in a third embodiment of the present invention.
Figure 17:
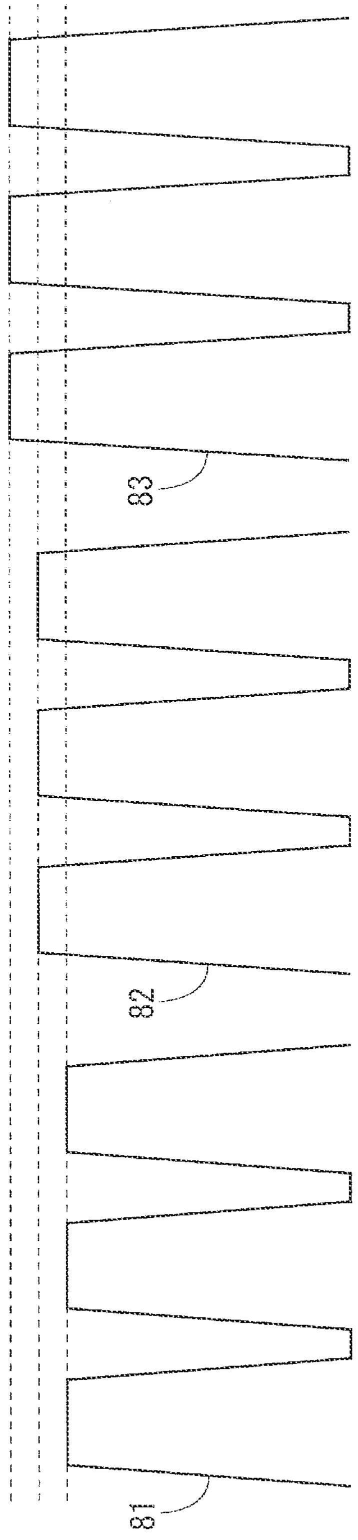
FIG. 17 is a diagram for explaining the multiplication of waveform data by a gain in the third embodiment.

In the present embodiment, as shown in FIG. 16, a waveform data correction unit 222 is provided in each head drive board 220. The other points are the same as those of the first embodiment. The waveform data correction unit 222 corrects the waveform data extracted from the waveform DB 230 to generate driving waveform data representing the waveform of the drive signal SD that is actually given to the inkjet head 241. The correction by the waveform data correction unit 222 is performed by multiplying the waveform data extracted from the waveform DB 230 by a predetermined gain. In this regard, in the present embodiment, the value of the gain is determined in advance for each inkjet head 241 in consideration of the ejection state of the ink from each inkjet head 241. In each head drive board 220, waveform data is extracted from the waveform DB 230 based on the waveform number WN transmitted from the head control unit 210. Then, the waveform data correction unit 222 multiplies the extracted waveform data by the gain to generate driving waveform data. The head drive board 220 gives the drive signal SD with the waveform represented by the generated driving waveform data to the inkjet head 241. For example, it is assumed that the drive waveform based on the waveform data extracted from the waveform DB 230 is a waveform denoted by reference numeral 81 in FIG. 17. In this case, when the value of the gain is 1.1, the drive signal SD with a drive waveform denoted by reference numeral 82 in FIG. 17 is given from the head drive board 220 to the inkjet head 241, and when the value of the gain is 1.2, the drive signal SD with a drive waveform denoted by reference numeral 83 in FIG. 17 is given from the head drive board 220 to the inkjet head 241. By using the gain in this manner, the waveform of the drive signal SD can be adjusted relatively easily.

Note that, although an example in which the value of the gain is determined in advance for each inkjet head 241 has been described, the present invention is not limited thereto. For example, the value of the gain may be determined in advance for each nozzle 250.

3.3 Effects

According to the present embodiment, the waveform of the drive signal SD given to the inkjet head 241 can be more finely adjusted. This makes it possible to reduce variations in print quality more effectively. Furthermore, by adjusting the waveform of the drive signal SD in consideration of the ejection state of the ink for each inkjet head 241, not only variations in print quality due to the content of the print job but also variations in print quality due to the difference in the ejection state of the ink among the plurality of inkjet heads 241 are reduced.

4. Modifications

Hereinafter, modifications will be described.

4.1 First Modification

As a first modification, a description will be given of an example in which the amount of ink consumed (the amount of ink expected to be consumed by printing based on print data) is acquired as an attribute of a print job in the control unit 150. In general, the greater the amount of ink consumed by the execution of a print job, the more likely it is that the drying of the printed print paper by the drying unit 26 will not be in time or that the supply of ink to the inkjet head 241 will not be in time. Therefore, variations in print quality can also be reduced by associating each print job with waveform data based on the amount of ink consumed as in the present modification.

Here, an example of how to obtain the amount of ink consumed (the amount of ink consumed for one ink color) will be described. In this example, it is assumed that three-stage sizes (S size, M size, L size) are provided as the dot sizes at the time of ink ejection. In this case, the respective appearance rates of the S size, the M size, and the L size are determined for each gradation value. The information of the appearance rate is held in the form of, for example, a table. The droplet amount corresponding to each dot size is obtained in advance. Here, the droplet amount corresponding to the S size is represented as P(S), the droplet amount corresponding to the M size is represented as P(M), and the droplet amount corresponding to the L size is represented as P(L).

The amount of ink consumed for one pixel is determined as follows. First, the respective appearance rates of the S size, the M size, and the L size are acquired based on the gradation value of the corresponding pixel. Here, the appearance rate of the S size is represented as R(S), the appearance rate of the M size is represented as R(M), and the appearance rate of the L size is represented as R(L). Then, an amount Q of ink consumed for the corresponding pixel is calculated by the following equation (1).

$$Q=P(S)\times R(S)+P(M)\times R(M)+P(L)\times R(L) \tag{1}$$

After the amount of ink consumed for each of all the pixels is calculated based on the above equation (1), the sum of all the calculated amounts of ink consumed is obtained, whereby the amount of ink consumed for one ink color when the print job is executed is obtained.

Since the amount of ink consumed can be obtained in the above manner, each print job can be associated with one or more pieces of waveform data among the plurality of pieces of waveform data stored in the waveform DB 230 based on the amount of ink consumed.

4.2 Second Modification

Figure 18:
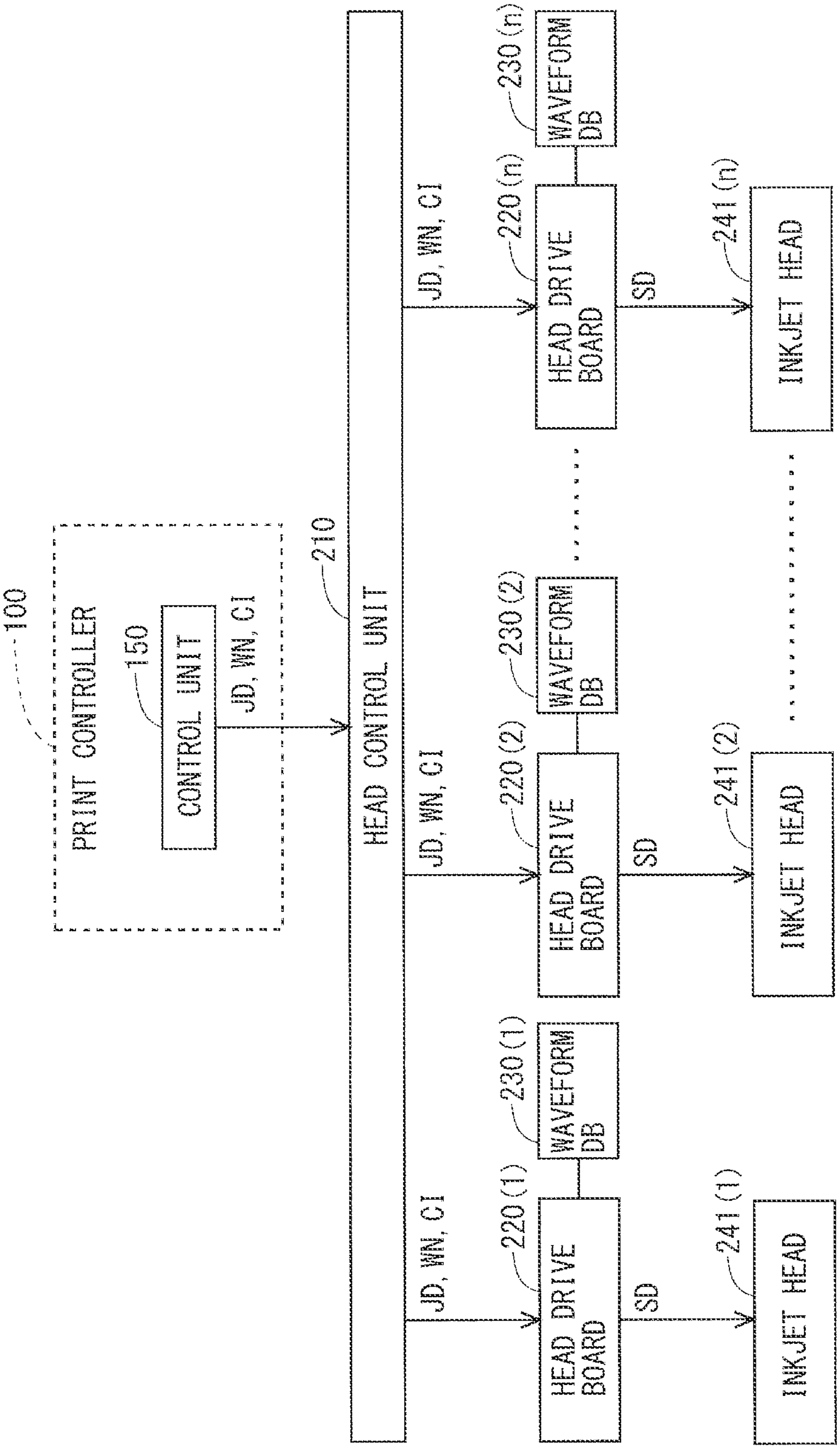
FIG. 18 is a block diagram for explaining a configuration related to the driving of inkjet heads in the second variant.

In each of the above embodiments, as shown in FIG. 6, the waveform DB 230 has been provided in common for the n head drive boards 220(1) to **220(*n*). That is, one waveform DB 230 has been provided. However, the present invention is not limited thereto. In the present modification, as shown in FIG. 18, n waveform DBs 230(1) to 230(*n*) corresponding one-to-one to the n head drive boards 220(1) to 220(*n*) are provided. That is, the waveform DB 230 is provided for each head drive board 220. In this configuration, each waveform DB 230 is achieved by, for example, a memory attached to the corresponding head drive board 220**.

In the present modification, each waveform DB 230 stores a plurality of pieces of waveform data corresponding to the corresponding inkjet head 241. For example, the waveform DB 230 corresponding to the head drive board 220 for driving the inkjet head 241 included in the C-color inkjet head row 240C (cf. FIG. 3) stores, as a plurality of pieces of waveform data, data representing a waveform suitable for high-speed printing for C-color and data representing a waveform suitable for low-speed printing for C-color.

According to the present modification, the time required for accessing the data in the waveform DB 230 from each head drive board 220 is shortened as compared to the configuration (cf. FIG. 6) in which the waveform DB 230 common to the plurality of head drive boards 220 is provided. This reduces the processing time.

4.3 Third Modification

In each of the above embodiments, it has been assumed that a plurality of print jobs are sequentially executed one by one. However, the present invention is not limited thereto. The present invention can also be applied to a case where a plurality of print jobs are executed simultaneously. In this regard, an example in which two print jobs are executed simultaneously will be described below as a third modification.

Figure 19:
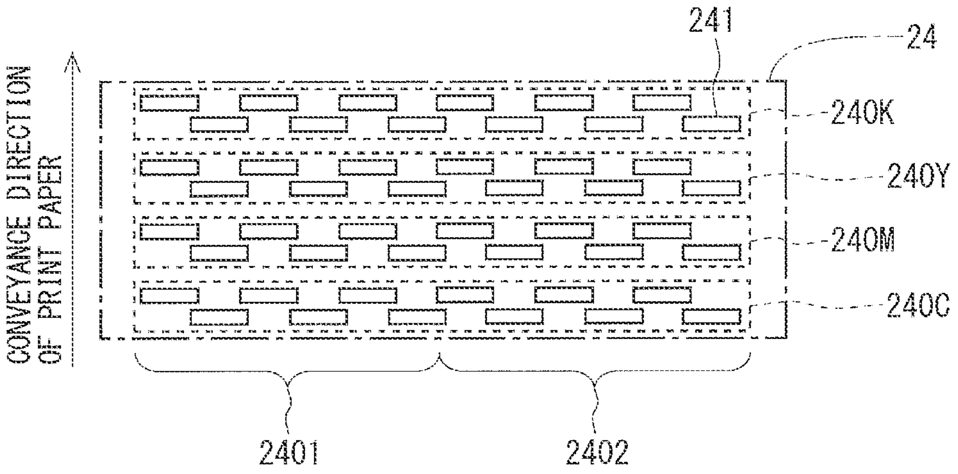
FIG. 19 is a diagram for explaining a first ink ejection unit and a second ink ejection unit in a third modification.

For simplicity of explanation, it is assumed here that printing based on different print jobs is performed on the left half of the print paper PA and the right half of the print paper PA. Thus, in the present modification, the plurality of inkjet heads 241 constituting the printing unit 24 are segmented into the inkjet heads 241 included in a portion denoted by reference numeral 2401 in FIG. 19 and the inkjet heads 241 included in a portion denoted by reference numeral 2402 in FIG. 19. For convenience, the portion denoted by reference numeral 2401 in FIG. 19 is referred to as a "first ink ejection unit", and the portion denoted by reference numeral 2402 in FIG. 19 is referred to as a "second ink ejection unit". That is, the printing unit 24 includes the first ink ejection unit 2401 and the second ink ejection unit 2402 arranged side by side in a direction orthogonal to the conveyance direction of the print paper PA. The ejection of ink from the first ink ejection unit 2401 and the ejection of ink from the second ink ejection unit 2402 are performed based on different print jobs.

Under the above assumption, for example, each print job is associated with one of the plurality of pieces of waveform data stored in the waveform DB 230 based on the image type TY of the main image constituting the print image. In this regard, attention is focused on a case where two print jobs (job X and job Y) are selected as the print jobs to be executed, printing based on job X is performed on the left half of the print paper PA, and printing based on job Y is performed on the right half of the print paper PA. In this case, the printing based on job X is performed by the inkjet head 241 included in the first ink ejection unit 2401, and the printing based on job Y is performed by the inkjet head 241 included in the second ink ejection unit 2402. Here, in this case, it is assumed that the image type TY of the main image constituting the print image is a character for job X and the image type TY of the main image constituting the print image is a picture for job Y. Note that, it is assumed that data is stored in the waveform DB 230 as shown in FIG. 12, and data is stored in the reference table RT as shown in FIG. 13. In this case, the drive signal SD with the waveform generated by the waveform data specified by waveform number "0" is given to the inkjet head 241 included in the first ink ejection unit 2401, and the drive signal SD with the waveform generated by the waveform data specified by waveform number "2" is given to the inkjet head 241 included in the second ink ejection unit 2402. That is, the drive signal SD with the waveform suitable for printing a character is given to the inkjet head 241 included in the first ink ejection unit 2401, and the drive signal SD with the waveform suitable for printing a picture is given to the inkjet head 241 included in the second ink ejection unit 2402.

According to the above example, in a case in which a print job for printing an image mainly including characters and a print job for printing an image mainly including a picture are executed simultaneously, sufficient print quality can be obtained for both the image mainly including characters and the image mainly including a picture.

As above, according to the present modification, even in a case where a plurality of print jobs are executed simultaneously, each print job is associated with appropriate waveform data, and hence it is possible to reduce variations in print quality as compared to the related art.

5. Others

The present invention is not limited to each of the above embodiments (including the modification), and various modifications can be made without departing from the gist of the present invention. For example, although an example in which the printing unit 24 includes inkjet head rows of four colors has been described in the embodiments described above, the present invention can also be applied to a case where the printing unit 24 includes inkjet head rows of five or more colors. Further, for example, although the configuration of the inkjet printing apparatus 10 that performs color printing has been described as an example in the embodiments described above, the present invention can also be applied to a case where an inkjet printing apparatus that performs monochrome printing is adopted.

This application is an application claiming priority based on Japanese Patent Application No. 2022-119656 entitled "Printing Apparatus and Printing Method" filed on Jul. 22, 2022, and the contents of which are herein incorporated by reference.

What is claimed is:

1. A printing apparatus that performs printing by ejecting ink onto a print medium, the printing apparatus comprising:

an ink ejection unit configured to eject ink onto the print medium based on a given drive signal;

an ejection control unit configured to give a drive signal to the ink ejection unit;

a waveform data holding unit configured to hold a plurality of pieces of waveform data representing respective waveforms of a plurality of drive signals;

an attribute acquisition unit configured to acquire an attribute of each print job by analyzing print data constituting each print job; and an association unit configured to associate each print job with one or more pieces of waveform data among the plurality of pieces of waveform data based on the attribute acquired by the attribute acquisition unit, wherein for each print job, the ejection control unit extracts waveform data associated by the association unit from the waveform data holding unit and gives, to the ink ejection unit, a drive signal with a waveform corresponding to the waveform data extracted.

2. The printing apparatus according to claim 1, further comprising:

a conveyance mechanism configured to convey the print medium;

a conveyance control unit configured to control a conveyance speed that is a distance by which the print medium is conveyed per unit time by the conveyance mechanism; and a drying unit configured to dry printed print medium, wherein the attribute acquisition unit acquires, as the attribute, a conveyance speed suitable for the drying unit to dry the printed print medium.

3. The printing apparatus according to claim 2, wherein the attribute acquisition unit includes a print rate calculation unit configured to calculate a print rate by analyzing the print data, and a conveyance speed specification unit configured to specify a conveyance speed suitable for the drying unit to dry the printed print medium based on the print rate calculated by the print rate calculation unit.

4. The printing apparatus according to claim 1, wherein the attribute acquisition unit acquires a print rate as the attribute.

5. The printing apparatus according to claim 1, wherein the attribute acquisition unit acquires, as the attribute, an amount of ink expected to be consumed by printing based on the print data.

6. The printing apparatus according to claim 1, wherein the attribute acquisition unit acquires, as the attribute, a type of an image represented by printing based on the print data.

7. The printing apparatus according to claim 6, wherein the attribute acquisition unit includes a print rate calculation unit configured to calculate a print rate for each image area by analyzing the print data, and an image type specification unit configured to specify an image type for each image area based on the print rate calculated by the print rate calculation unit, and for each print job, the association unit associates each image area with one of the plurality of pieces of waveform data based on the image type specified by the image type specification unit.

8. The printing apparatus according to claim 1, wherein the association unit associates each print job with the one or more pieces of waveform data using waveform identification data for identifying the plurality of pieces of waveform data, and the ejection control unit extracts the waveform data associated by the association unit from the waveform data holding unit based on the waveform identification data.

9. The printing apparatus according to claim 8, wherein the ejection control unit includes a drive control unit configured to receive the waveform identification data from the association unit and output the waveform identification data, for each print job, and a driving unit configured to be accessible to the waveform data holding unit and configured to extract the waveform data associated by the association unit from the waveform data holding unit based on the waveform identification data outputted from the drive control unit.

10. The printing apparatus according to claim 1, wherein the ink ejection unit includes a plurality of print heads, the ejection control unit includes a plurality of head drive boards corresponding one-to-one to the plurality of print heads, the association unit associates each print job with one of the plurality of pieces of waveform data for each print head, and each of the plurality of head drive boards gives, to a corresponding print head, a drive signal with a waveform corresponding to the waveform data associated by the association unit.

11. The printing apparatus according to claim 1, wherein the ink ejection unit includes a plurality of nozzles, the association unit associates each print job with one of the plurality of pieces of waveform data for each nozzle, and the ejection control unit gives, to the ink ejection unit, a plurality of drive signals corresponding respectively to the plurality of nozzles so that ink is ejected from each nozzle based on a drive signal with a waveform corresponding to the waveform data associated by the association unit.

12. The printing apparatus according to claim 1, wherein the ink ejection unit includes a plurality of print heads, the ejection control unit includes a plurality of head drive boards corresponding one-to-one to the plurality of print heads, the waveform data holding unit is provided corresponding to each of the plurality of head drive boards, and the waveform data holding unit provided corresponding to each head drive board holds a plurality of pieces of waveform data corresponding to a corresponding print head.

13. The printing apparatus according to claim 12, wherein the waveform data holding unit is a memory attached to a corresponding head drive board.

14. The printing apparatus according to claim 1, wherein the ink ejection unit includes a plurality of print heads, the ejection control unit includes a plurality of head drive boards corresponding one-to-one to the plurality of print heads, and the waveform data holding unit is commonly provided on the plurality of head drive boards.

15. The printing apparatus according to claim 1, wherein the ejection control unit includes a waveform data correction unit configured to generate driving waveform data by correcting the waveform data extracted from the waveform data holding unit, and a drive signal with a waveform represented by the driving waveform data is given to the ink ejection unit.

16. The printing apparatus according to claim 15, wherein the waveform data correction unit generates the driving waveform data by multiplying the waveform data extracted from the waveform data holding unit by a predetermined gain.

17. The printing apparatus according to claim 1, further comprising a conveyance mechanism configured to convey the print medium, wherein the ink ejection unit includes a first ink ejection unit and a second ink ejection unit arranged side by side in a direction orthogonal to a direction in which the print medium is conveyed by the conveyance mechanism, and ejection of ink from the first ink ejection unit and ejection of ink from the second ink ejection unit are performed based on different print jobs.

18. A printing apparatus that performs printing by ejecting ink onto a print medium, the printing apparatus comprising:

a plurality of print heads configured to eject ink onto the print medium based on a given drive signal;

an ejection controller configured to give a drive signal to the plurality of print heads;

a waveform data database configured to hold a plurality of pieces of waveform data representing respective waveforms of a plurality of drive signals; and a processor configured to acquire an attribute of each print job by analyzing print data constituting each print job and associate each print job with one or more pieces of waveform data among the plurality of pieces of waveform data based on the attribute, wherein for each print job, the ejection controller extracts waveform data associated by the processor from the waveform data database and gives, to the plurality of print heads, a drive signal with a waveform corresponding to the waveform data extracted.

19. A printing method in a printing apparatus including an ink ejection unit configured to eject ink onto a print medium based on a given drive signal, the printing method comprising:

an attribute acquisition step of acquiring an attribute of each print job by analyzing print data constituting each print job;

an association step of associating each print job with one or more pieces of waveform data among a plurality of pieces of waveform data based on the attribute acquired in the attribute acquisition step; and an ejection control step of giving a drive signal to the ink ejection unit, wherein the printing apparatus includes a waveform data holding unit configured to hold a plurality of pieces of waveform data representing respective waveforms of a plurality of drive signals, and in the ejection control step, for each print job, waveform data associated in the associating step is extracted from the waveform data holding unit and a drive signal with a waveform corresponding to the waveform data extracted is given to the ink ejection unit.

* * * * *